(12) United States Patent
Jeong et al.

(10) Patent No.: US 9,336,471 B2
(45) Date of Patent: *May 10, 2016

(54) CRUM CHIP, IMAGE FORMING APPARATUS, AND COMMUNICATION METHOD OF CRUM CHIP

(71) Applicant: SAMSUNG Electronics Co., Ltd., Suwon-si, Gyeonggi-do (KR)

(72) Inventors: Jae-Hyeong Jeong, Seongnam-si (KR); Hong-rok Woo, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 270 days.

This patent is subject to a terminal disclaimer.

(21) Appl. No.: 13/721,289

(22) Filed: Dec. 20, 2012

(65) Prior Publication Data

US 2013/0155459 A1 Jun. 20, 2013

(30) Foreign Application Priority Data

Dec. 20, 2011 (KR) ........................ 10-2011-0138708

(51) Int. Cl.
*G06K 15/00* (2006.01)
*G06F 21/44* (2013.01)
*G06F 21/60* (2013.01)

(52) U.S. Cl.
CPC .......... *G06K 15/4005* (2013.01); *G06F 21/445* (2013.01); *G06F 21/606* (2013.01)

(58) Field of Classification Search
USPC ......................................................... 396/24
See application file for complete search history.

(56) References Cited

U.S. PATENT DOCUMENTS

| 6,267,463 B1 | 7/2001 | Paulsen et al. |
| 6,640,294 B2 | 10/2003 | Debiez et al. |
| 7,249,108 B1 | 7/2007 | Walmsley et al. |

(Continued)

FOREIGN PATENT DOCUMENTS

| EP | 0281223 | 9/1988 |
| JP | 11-334059 | 12/1999 |

(Continued)

OTHER PUBLICATIONS

European Examination Report issued Jun. 8, 2015 in corresponding European Application No. 13177300.4.

(Continued)

*Primary Examiner* — Clayton E Laballe
*Assistant Examiner* — Linda B Smith
(74) *Attorney, Agent, or Firm* — Staas & Halsey LLP

(57) ABSTRACT

A CRUM chip mountable on a consumables unit of an image processing unit includes an interface unit configured to receive a first signal including first data and first integrity monitoring data for the first data from a main body of the image forming apparatus, a monitoring unit configured to separate the first integrity monitoring data from the first signal and monitor integrity of the first signal, a data processing unit configured to generate second data to be transmitted to the main body of the image processing unit, a generating unit configured to generate second integrity monitoring data using the second data and the first integrity monitoring data, and a control unit configured to control the interface unit to transmit a second signal including the second data and the second integrity monitoring data to the main body of the image forming apparatus. Therefore, stability of communication is improved.

17 Claims, 10 Drawing Sheets

(56) References Cited

U.S. PATENT DOCUMENTS

| | | | |
|---|---|---|---|
| 7,650,388 B2 * | 1/2010 | Rodriguez et al. | 709/216 |
| 8,069,477 B2 | 11/2011 | Lee et al. | |
| 8,069,478 B2 | 11/2011 | Cho et al. | |
| 8,176,549 B2 | 5/2012 | Lee et al. | |
| 8,330,966 B2 | 12/2012 | Lee et al. | |
| 8,332,934 B2 | 12/2012 | Lee et al. | |
| 8,386,781 B2 | 2/2013 | Cho et al. | |
| 8,422,058 B2 | 4/2013 | Zona | |
| 8,453,260 B2 | 5/2013 | Lee et al. | |
| 8,537,382 B2 * | 9/2013 | Tokairin | 358/1.14 |
| 2003/0215245 A1 * | 11/2003 | Silence et al. | 399/8 |
| 2006/0136989 A1 | 6/2006 | Rodriguez et al. | |
| 2006/0193642 A1 * | 8/2006 | Morimoto | G03G 15/553 399/12 |
| 2007/0047974 A1 | 3/2007 | Tanaka | |
| 2007/0058991 A1 | 3/2007 | Rommelmann et al. | |
| 2009/0129559 A1 | 5/2009 | Fukami et al. | |
| 2009/0220077 A1 | 9/2009 | Lee et al. | |
| 2009/0222664 A1 | 9/2009 | Cho et al. | |
| 2009/0222886 A1 | 9/2009 | Lee et al. | |
| 2010/0039485 A1 | 2/2010 | Rodriguez et al. | |
| 2010/0128298 A1 | 5/2010 | Matsugashita | |
| 2011/0002002 A1 | 1/2011 | Lee et al. | |
| 2011/0004746 A1 | 1/2011 | Lee et al. | |
| 2011/0004768 A1 | 1/2011 | Cho et al. | |
| 2011/0044703 A1 | 2/2011 | Fuse | |
| 2011/0093702 A1 * | 4/2011 | Eom et al. | 713/168 |
| 2012/0134687 A1 * | 5/2012 | Jones et al. | 399/12 |
| 2012/0222130 A1 | 8/2012 | Lee et al. | |
| 2013/0070301 A1 | 3/2013 | Lee et al. | |
| 2013/0108285 A1 * | 5/2013 | Spink et al. | 399/24 |

FOREIGN PATENT DOCUMENTS

| | | |
|---|---|---|
| KR | 10-2006-0059668 | 6/2006 |
| KR | 10-2011-0014535 | 2/2011 |
| KR | 10-2011-0023412 | 3/2011 |
| WO | WO 2009/145774 | 12/2009 |

OTHER PUBLICATIONS

European Search Report issued Jun. 29, 2012 in corresponding European Patent Application No. 12160258.5.

European Search Report issued May 4, 2015 in corresponding European Application No. 13177300.4.

International Search Report and Written Opinion issued Nov. 27, 2013 in corresponding International Application No. PCT/KR2013/006430.

Korean Office Action issued Jul. 22, 2014 in corresponding Korean Application No. 10-2013-0048712.

U.S. Office Action issued Mar. 13, 2014 in related U.S. Appl. No. 13/445,535.

U.S. Office Action issued Oct. 22, 2014 in related U.S. Appl. No. 13/445,535.

U.S. Notice of Allowance issued May 26, 2015 in related U.S. Appl. No. 13/445,535.

U.S. Office Action issued Aug. 22, 2014 in related U.S. Appl. No. 13/963,205.

U.S. Office Action issued Apr. 6, 2015 in related U.S. Appl. No. 13/963,205.

U.S. Office Action issued Nov. 17, 2015 in related U.S. Appl. No. 13/963,205.

* cited by examiner

CRUM CHIP, IMAGE FORMING APPARATUS, AND COMMUNICATION METHOD OF CRUM CHIP

CROSS-REFERENCE TO RELATED APPLICATIONS

This application claims priority under 35 U.S.C. §119 from Korean Patent Application No. 10-2011-0138708, filed on Dec. 20, 2011, in the Korean Intellectual Property Office, the disclosure of which is incorporated herein by reference in its entirety.

BACKGROUND

1. Field of the General Inventive Concept

Apparatuses and methods consistent with exemplary embodiments relate to a customer replaceable unit monitoring (CRUM) chip, an image forming apparatus, and a communication method of the CRUM chip, and more particularly, to a CRUM chip, an image forming apparatus, and a communication method of a CRUM chip which monitor presence/absence of integrity using integrity monitoring data in a communication process.

2. Description of the Related Art

With the spread activation of computers, the spread of computer peripherals is increasing day by day. Examples of computer peripherals include image forming apparatuses such as printers, facsimile, scanners, copiers, and multifunction peripherals.

Image forming apparatuses use ink or toner to print images on paper. When an image forming process is performed, ink and toner is used. Thus the ink or toner is exhausted when the ink or toner is used over a predetermined time. In this case, a unit which stores ink or toner should be newly replaced. Parts or components which are replaceable during use of the image forming apparatus are referred to as consumables units or replaceable units. Here, for clarity, the parts or components referred to as consumables units.

Consumables units include units which are replaced when a property is changed due to use of a consumable over a fixed period and good print quality is not expected, in addition to the units which are replaced due to exhaustion of ink or toner. That is, in addition to developers for colors, there are parts such as an intermediate transfer belt that are consumables units.

Specifically, a charging unit, a transfer unit, a fusing unit, and the like are used in laser image forming apparatuses. When various kinds of rollers, belts, and the like used in each unit are used over a lifetime limit, the roller and belts may be worn and spoiled. Thus, image quality is considerably degraded. To allow a printing job for clean images to be performed, users should replace component units, that is, consumables units at appropriate replacement times.

In recent years, consumables units have been implemented to be provided with a memory therein and to transmit and receive data from a main body of an image forming apparatus so that the consumables unit is appropriately managed.

That is, various use information such as a number of printing sheets, a number of output dots, and a term of use of the image forming apparatus is recorded in the consumables unit itself so that it is possible to accurately manage a replacement time of the consumables unit, and the like.

A main controller provided in a main body of the image forming apparatus performs communication with a memory unit provided in the consumables unit to manage the information. However, various variables are present in the communication process. For example, there may be noise interference caused by an electronic circuit or a motor provided in the image forming apparatus or attack by a hacker who controls the main controller or the memory unit for malicious purposes.

Communication data may be changed due to the variables. For example, when a corresponding job is completed, the consumables unit transmits information such as the number of printing sheets, the number of output dots, and a remaining amount of toner to the main controller and copies the information into a nonvolatile memory of the main controller. In this case, when data is read as a wrong value such as 0xFFFFFFFF, there is the risk in which the main controller recognizes that a corresponding consumables unit's life has ended. Meanwhile, the hacker may reset use information of the consumables unit whose life has ended as zero (0) and set the consumables unit to be in a reproducible state. Therefore, the consumables unit whose life has ended is misrepresented as containing ink or toner and is used so that failure of the image forming apparatus or degradation of image quality is caused.

Therefore, there is a need for technology to effectively monitor a communication error between the consumables unit and the image forming apparatus and promoting stability of data.

SUMMARY

The present general inventive concept provides a CRUM chip mountable on a consumables unit of an image processing unit. Features of the present general inventive concept include an interface unit, a monitoring unit, a data processing unit, a generating unit, and a control unit configured to control an interface unit to transmit a signal including integrity monitoring data to a main body of an image forming apparatus to improve stability of communication thereof.

One or more exemplary embodiments is provided to a method of providing a CRUM chip, an image forming apparatus, and a communication method of the CRUM chip which are capable of promoting using integrity monitoring data.

Additional features and utilities of the present general inventive concept will be set forth in part in the description which follows and, in part, will be obvious from the description, or may be learned by practice of the general inventive concept.

An embodiment of the present general inventive concept may be achieved by providing a CRUM chip mountable on a consumables unit of an image processing unit. The CRUM chip may include an interface unit configured to receive a first signal including first data and first integrity monitoring data for the first data from a main body of the image forming apparatus, a monitoring unit configured to separate the first integrity monitoring data from the first signal and monitor integrity of the first signal, a data processing unit configured to generate second data to be transmitted to the main body of the image processing unit, a generating unit configured to generate second integrity monitoring data using the second data and the first integrity monitoring data, and a control unit configured to control the interface unit to transmit a second signal including the second data and the second integrity monitoring data to the main body of the image forming apparatus.

The CRUM chip may further include a temporary storage unit configured to store the first data and the first integrity monitoring data included in the first signal when it is determine that the first signal is integrity, and a storage unit configured to store the data temporarily stored in the temporary storage unit.

The monitoring unit may generate comparative target data using remaining data included in the first signal, compare the second integrity monitoring data separated from the second signal with the comparative target data, determine the second signal as integrity when the second integrity monitoring data is identical with the comparative target data, and determine the second signal as an error state when the second integrity monitoring data is not identical with the comparative target data.

Alternatively, the monitoring unit may perform integrity monitoring for a third signal including third integrity monitoring data, which is generated by cumulatively reflecting the second integrity monitoring data, when the third signal is received through the interface unit, and finally monitor integrity of total signals, which are received in a process of performing an image forming job, using final integrity monitoring data included in a signal finally received in the process of performing an image forming job when the image forming job is completed.

The control unit may store the data temporarily stored in the temporary storage unit in the storage unit when it is determined that the total signals are integrity as a final monitoring result.

The first data or the second data may include at least one selected from the group consisting of a command, a recording target information, information for job performance result according to the command, information for integrity monitoring result about a previously received signal, and indicator information to inform a position of the first and second integrity monitoring data.

The information for integrity monitoring result may be excluded in a signal first transmitted from the CRUM chip.

The integrity monitoring data may be a result value for logic operation of the data, a result value generated by applying a preset equation for the data, or an encryption result value in which the data is encrypted.

An embodiment of the present general inventive concept may also be achieved by providing a communication method of a CRUM chip mountable on a consumables unit of an image forming apparatus. The method may include receiving a first signal including first data and first integrity monitoring data for the first data from a main body of the image forming apparatus, separating the first integrity monitoring data from the first signal and monitoring integrity of the first signal, temporarily storing the first data and the first integrity monitoring data included in the first signal when it is determined that the first signal is integrity, generating second data to be transmitted to a main body of the image forming apparatus when the second data is present, generating second integrity monitoring data using the second data and the first integrity monitoring data, and transmitting a second signal including the second data and the second integrity monitoring data to the main body of the image forming apparatus.

The monitoring may include separating the first integrity monitoring data from the first signal, generating comparative target data using remaining data included in the first signal, and comparing the second integrity monitoring data separated from the second signal with the comparative target data, determining the second signal as integrity when the second integrity monitoring data is identical with the comparative target data, and determining the second signal as an error signal when it is determined that the second integrity monitoring data is not identical with the comparative target data.

The method may further include performing integrity monitoring for a third signal including third integrity monitoring data, which is generated by cumulatively reflecting the second integrity monitoring data, when the third signal is received from the body of the image forming apparatus.

The method may further include finally monitoring integrity of the total signals received in a process of performing an image forming job using final integrity monitoring data included in a signal finally received in the process of performing an image forming job, when the image forming job is completed, and storing signals temporarily stored when it is determined that the total signals are integrity.

The first data or the second data may include at least one selected from the group consisting of a command, a recording target information, information for job performing result according to the command, information for integrity monitoring result about a previously received signal, and indicator information to notify a position of the (first and second) integrity monitoring data.

The information for integrity monitoring result may be excluded in a signal first transmitted from the CRUM chip.

The first and second integrity monitoring data may be a result value for logic operation of the data, a result value generated by applying a preset equation for the data, or an encryption result value in which the data is encrypted.

An embodiment of the present general inventive concept may be achieved by providing a method of establishing communication between a CRUM chip mountable on a consumables unit and an image forming apparatus, the method comprising initializing the CRUM chip separate from an initialization of the image forming apparatus; receiving a first signal including first data and first integrity monitoring data, generating second integrity monitoring data and verifying the integrity of the first signal, generating and transmitting a second signal including second data and the second integrity monitoring signal that includes the first integrity monitoring data, verifying the integrity of the second signal to establish communication between the consumables unit and the image forming apparatus.

Verifying the integrity of a signal may include comparing received integrity monitoring data to generated integrity monitoring data.

The initializing of the CRUM chip may be performed by a CPU of the CRUM chip.

The consumables unit may not respond to a command of the image forming apparatus until after initialization is complete.

The integrity monitory data may be error detection data.

BRIEF DESCRIPTION OF THE DRAWINGS

The above and/or other features and utilities of the present general inventive concept will become more apparent and readily appreciated from the following description of the exemplary embodiments, taken in conjunction with reference to the accompanying drawings, of which.

DETAILED DESCRIPTION OF THE PREFERRED EMBODIMENTS

Figure 1:
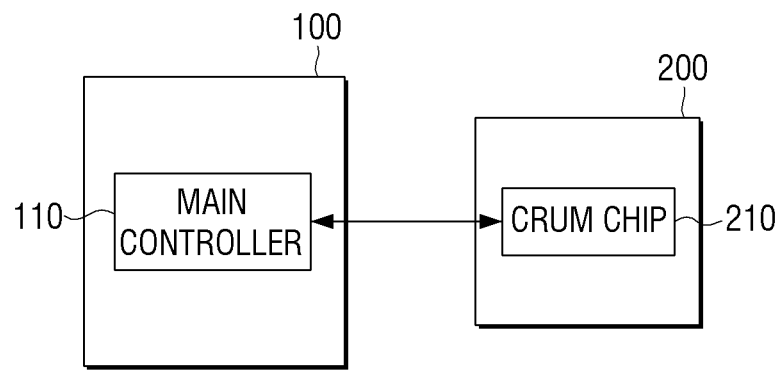
FIG. 1 is a block diagram illustrating a configuration of an image forming apparatus according to an exemplary embodiment of the present general inventive concept.

Hereinafter, exemplary embodiments will be described in more detail with reference to the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a configuration of an image forming apparatus according to an exemplary embodiment. Referring to FIG. 1, an image forming apparatus includes a main body 100, a main controller 110 provided in the main body 100, and a consumables unit 200 mountable on the main body 100. Here, the image forming apparatus may be implemented with various types of apparatuses which are capable of forming an image on a paper or various kinds of recording media, such as a printer, a scanner, an MFP, a facsimile, a copier and the like.

The main controller 110 is installed in the main body 100 of the image forming apparatuses and controls an overall function of the image forming apparatus.

The consumables unit 200 may be installed on the main body 100 of the image forming apparatus and may include various kinds of units which are directly or indirectly involved in an image forming job. For example, the consumables unit 200 in a laser image forming apparatus may include a charging unit, an exposure unit, a developing unit, a transfer unit, a fusing unit, different kinds of rollers, a belt, an organic photo conductor (OPC) drum, and the like. In addition, various kinds of units needed to be replaced in use of the image forming apparatus may be defined as a consumables unit 200.

As described above, the consumables unit 200 has a fixed lifetime. Therefore, the consumables unit 200 includes a CRUM chip 210 installed in the consumables unit 200 to gather and provide information so that the consumables unit 200 may be be appropriately replaced.

The CRUM chip 210 is configured to be installed on the consumables unit 200 and records various pieces of information. The CRUM chip 210 includes a memory. Therefore, the CRUM chip 210 may be called various terms such as a memory unit or a CRUM memory. Here, for clarity, it may be referred to as the CRUM chip 210.

A memory provided in the CRUM chip 210 may store various attribute information for the consumables unit 200, the CRUM chip 210, and the image forming apparatus, and use information or programs related to image processing to perform an image forming job.

It is possible that various kinds of programs stored in the CRUM chip may include a general application, an operating system (OS) program, an encryption program, or the like. In addition, the attribute information may include information for a manufacturer of the consumables unit 200, information for a manufacturer of the image forming apparatus, an apparatus name of a mountable image forming apparatus, information for a manufacture date, a serial number, a model name, electronic signature information, an encryption key, an index of an encryption key, and the like. In addition, the use information may be information for the number of current printing sheets, the number of remaining printing sheets to be printable, an amount of remaining toner, and the like. Alternatively, the attribute information may be referred to as unique information.

For example, the CRUM chip 210 may store the following information.

TABLE 1

| General Information | |
|---|---|
| OS Version | CLP300_V1.30.12.35 02-22-2007 |
| SPL-C Version | 5.24 06-28-2006 |
| Engine Version | 6.01.00(55) |
| USB Serial Number | BH45BAIP914466B. |
| Set Model | DOM |
| Service Start Date | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0, 0, 0, 0) |
| Setup Menu | |
| Power Save | 20 Minutes |
| Auto Continue | On |
| Altitude Adj. | Plain |

As described herein, the memory of the CRUM chip 210 may store schematic information for a consumables unit 200 as well as information for a lifetime of consumables, information for the consumables, and information for a setup menu. In addition, the memory of the CRUM chip 210 may further include an OS which is provided to be used in the consumables unit separately from the image forming apparatus.

Alternatively, the CRUM chip 210 may further include a central processing unit (CPU) (not illustrated) which manages the memory, executes various kinds of programs stored the memory, and performs communication with the main body 100 of the image forming apparatus or controllers of other apparatuses.

The CPU may cause the OS stored in the memory of the CRUM chip 210 to perform initialization of the consumables unit 200 separately from initialization of the image forming apparatus. In addition, the CPU may perform certification between the main body 100 of the image forming apparatus and the CRUM chip 210 when the initialization is completed, or as a part of the initialization process. When the certification is completed, the CPU may perform encryption data communication between the main body 100 of the image forming apparatus and the CRUM chip 210. At this time, various kinds of commands and data transmitted to the CRUM chip 210 from the main body of the image forming apparatus may be encrypted and transmitted according to an arbitrary encryption algorithm.

Specifically, when a specific event, for example, power of the image forming apparatus provided with the consumables unit 200 turns on or the consumables unit 200 is mounted on the main body of the image forming apparatus again after the consumables unit 200 is detached from the image forming apparatus, the CPU may autonomously perform initialization separately from initialization of the main controller 110. The initialization may include various processes to perform initial driving of various kinds of application programs used in the consumables unit 200, calculating confidential information necessary for data communication with the main controller 110 after the initialization, setting up communication channels, initializing a memory value, conforming an autonomous replacement time, setting an internal register value in the consumables unit 200, setting internal and external clock signals, and the like.

Here, the setting of the register values denotes a job of setting functional register values inside the consumables unit 200 so that the consumables unit 200 operates depending on various types of functional states previously set by a user. In addition, the setting of the register values denotes a job of adjusting a frequency of an external clock signal provided from the main controller 110 of the image forming apparatus to be suitable for an internal clock signal used in the CPU inside of the consumables unit 200.

In addition, the confirming of an autonomous replacement time may be a job of recognizing a remaining amount of ink or toner used until a certain time, estimating a final time when the toner or ink is to be completely exhausted, and notifying the main controller 110 of the estimated final time. Thus, if it is determined during initialization of the consumables unit 200 that the toner has been previously exhausted, after the initialization is completed, the consumables unit 200 may be implemented so that the consumables unit 200 autonomously notifies the main controller 110 of a job-disabled state thereof. In addition, since the consumables unit 200 has its own OS, the initialization may be performed in various manners according to a kind of the consumables unit 200 and the attributes of the consumables unit 200.

As described above, when the CRUM chip 210 is provided with the CPU therein and has the OS thereof, if the image forming apparatus turns on, the CRUM chip may confirm a remaining amount of consumables in a consumables unit 200 or refilling data stored in the memory unit before the main controller 110 requests communication with the consumables unit 200. Thus, since the CRUM chip 210 has a CPU and memory and can self-initialize to determine its own status of consumables used, lack of the consumables may be rapidly notified as compared with the related art. For example, when the toner is lacking, after power turns on, a user may be informed of the status of the consumables unit 200 and operate an image forming apparatus to cause the image forming apparatus to be in a power save mode and perform an image forming process using less toner. Even when only specific toner is lacking, the user may enable the image forming apparatus to execute the above-described process.

Until the initialization is progressed and completed, the CPU does not respond to a command of the main controller 110. The main controller 110 may periodically transmit one or more commands and wait for responses to the one or more commands from the CPU.

Thus, when the response, or acknowledge is received, certification is performed between the main controller 110 and the CPU. In this case, the OS installed in the CRUM chip 210 enables the certification through interaction between the CRUM unit 210 and the main controller 110.

Specifically, the main controller 110 may encrypt data or a command for the certification and transmit encrypted data or command to the CRUM chip 210. The transmitted data may include an arbitrary value R1. Here, the value R1 may be a value which is randomly changed each time certification is performed. Alternatively, the value R1 may be an arbitrarily set value. The CRUM chip 210 which receives the encrypted data generates a session key using an arbitrary value R2 and the received value R1 and generates a message authentication code (MAC) using the generated session key. Therefore, the CRUM chip 210 transmits a signal including the generated MAC and the value R2 to the main controller 110. The main controller 110 generates a session key using the received values R2 and R1, generates a MAC using the generated session key, and compares the generated MAC and the MAC included in the received signal to certify the CRUM chip 210. Alternatively, according to various exemplary embodiments, electronic signature information, key information, and the like may be transmitted and received and used in the certification.

When certification succeeds, the main controller 110 may perform encryption data communication for data management with the CRUM chip 210. That is, when a user command is input, or when an image forming job starts or is completed, the main controller 110 encrypts a command, data, and the like to perform a job such as data reading or data writing using an encryption algorithm and transmits the encrypted command, data, and the like to the CRUM chip 210. The CRUM chip 210 may decode the received command, data, and the like and perform a job such as data reading, data writing, and the like to correspond to the decoded command. The encryption algorithm used in the CRUM chip 210 or the main controller 110 may be a standard encryption algorithm. Such an encryption algorithm may be changeable when an encryption key is published or it is necessary to strengthen security for the encryption key. Specifically, various encryption algorithms such as Rivest Shamir Adleman (RSA) asymmetric key algorithm, Academy, Research Institute, Agency (ARIA) algorithm, triple data encryption standard (TDES) algorithm, SEED algorithm, advanced encryption standard (AES) symmetric algorithm, and the like may be used.

Communication for certification and data replacement between the CRUM chip 210 and the main controller 110 may be performed several times. Whenever the communication is performed, a signal is transmitted from the main controller 110 to the CRUM chip 210, or a signal is transmitted from the CRUM chip 210 to the main controller 110. In this case, transmitted data includes integrity monitoring data (that is, error detection data) to monitor integrity of data included in a corresponding signal. The integrity monitoring data is generated by cumulatively reflecting integrity monitoring data included in a signal transmitted or received just before communication.

That is, as described above, a plurality of communication such as certification 1, certification 2, certification 3, . . . , certification n, data communication 1, data communication 2, . . . , data communication m may be performed between the main controller 110 and the CRUM chip 210. The integrity monitoring data may be included in a signal that is transmitted in every communication. Regarding the integrity monitoring data, integrity monitoring data used in previous communications may be cumulatively reflected. The integrity monitoring data will be described with reference to the following drawings below.

In a side in which a signal is received, integrity of a corresponding signal is monitored using the integrity monitoring data included in the signal. Therefore, if it is determined that the corresponding signal is an integrity signal, the data and the integrity monitoring data included in the signal is temporarily stored. Then, using next data to be transmitted to a side from which the signal is transmitted and the integrity monitoring data which is received just before communication and temporarily stored, new integrity monitoring data is generated. Thereby, a signal in which new integrity monitoring data is added to the next data is transmitted. A plurality of communication operations including the integrity monitoring data are performed between the main controller 110 and the CRUM chip 210, and error detection is performed at each stage of communication between the main controller 110 and the CRUM chip 210. That is, when either of the main controller 110 or CRUM chip 210 receives a signal including data and integrity monitoring data, error detection is performed on that signal. When a final communication is performed, a final monitoring operation using integrity monitoring data included in a received final signal is performed. As a final monitoring, when there is no error, total data which are temporarily stored until the final monitoring is performed.

Figure 2:
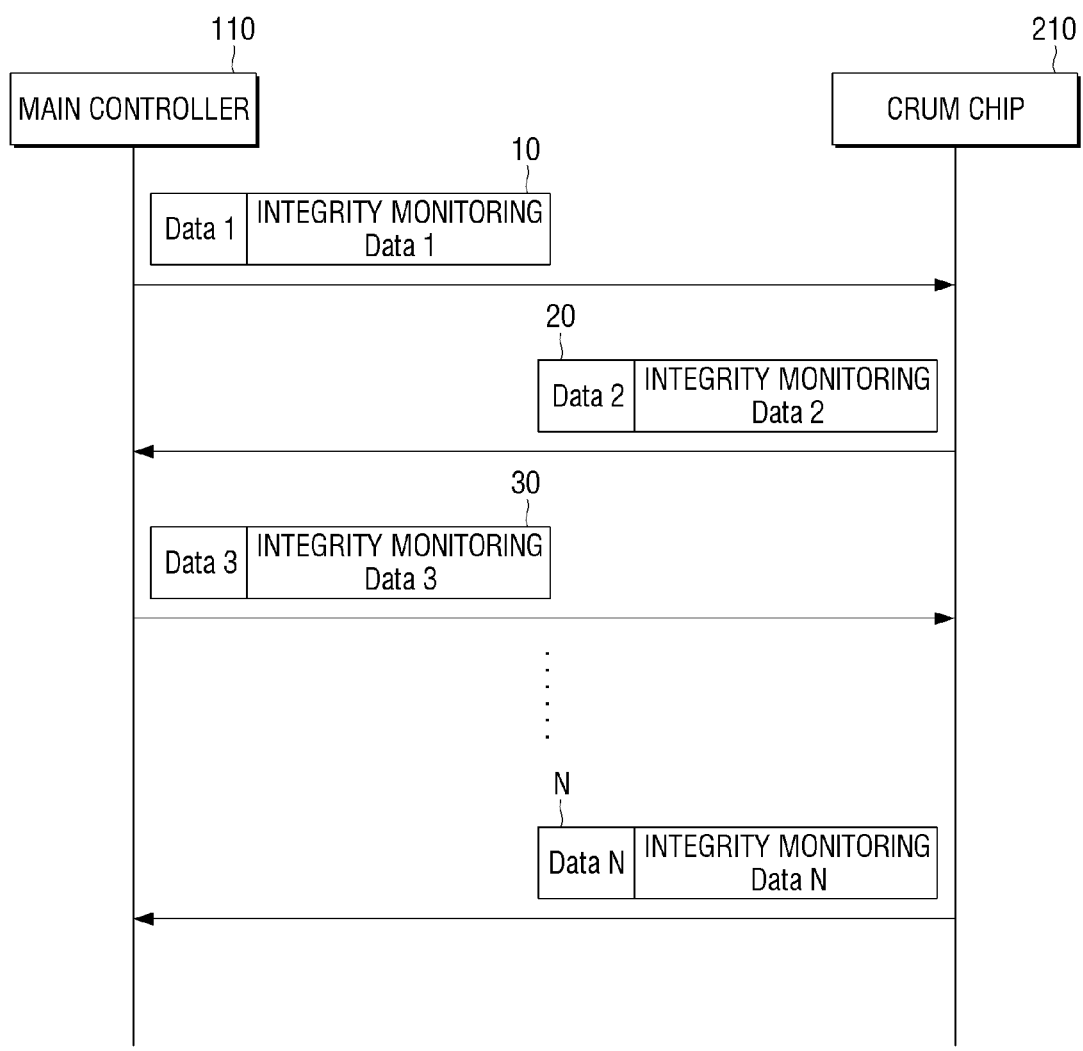
FIG. 2 is a timing diagram illustrating a communication process between a main controller and a CRUM chip in an image forming apparatus according to an exemplary embodiment of the present general inventive concept.

FIG. 2 is a timing diagram illustrating a communication process between the main controller 110 and the CRUM chip 210 according to an exemplary embodiment. Referring to FIG. 2, the main controller 110 transmits a first signal 10 including data 1 and integrity monitoring data 1. The CRUM chip 210 which receives the first signal 10 generates a second signal 20 including integrity monitoring data 2 using the integrity monitoring data 1 included in the data 1 and data 2. The CRUM chip 210 transmits the second signal 20 including the data 2 and the integrity monitoring data 2 to the main controller 110. The above-described process is performed on signals 30 to N including integrity monitoring data generated using integrity monitoring data in previous communication plural times.

Examples of the integrity monitoring data may include a result value in which data to be transmitted is logically operated, a result value which is generated by applying a preset equation to data, an encryption result value in which data is encrypted, that is, MAC, and the like.

Figure 3:
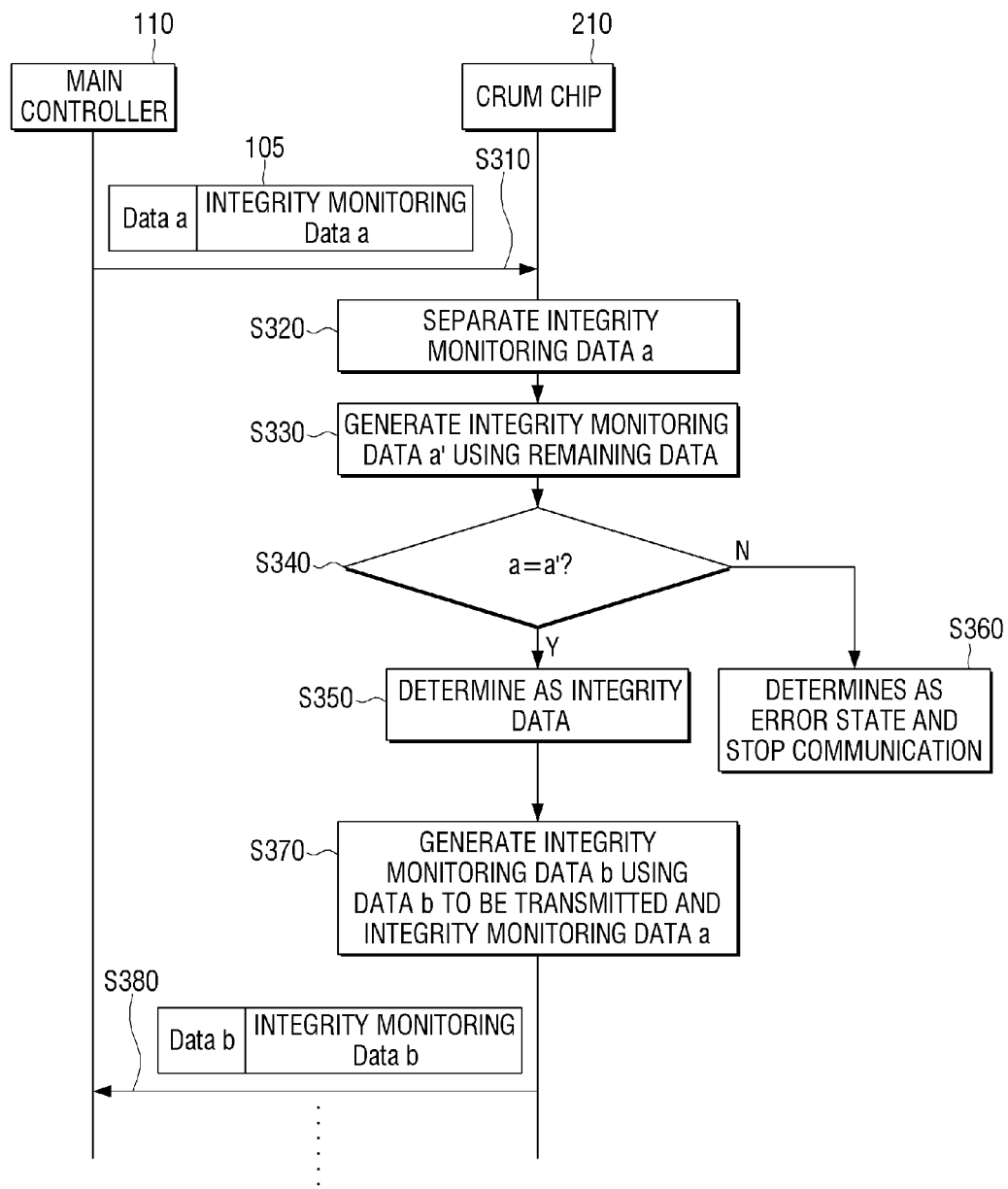
FIG. 3 is a detailed timing diagram illustrating an integrity monitoring process using integrity monitoring data according to an exemplary embodiment of the present general inventive concept.

FIG. 3 is a view illustrating a monitoring method using integrity monitoring data. Referring to FIG. 3, when a signal 105 including data a and integrity monitoring data a are received from the main controller 110 (operation S310), the CRUM chip 210 separates the integrity monitoring data a (operation S320).

Using remaining data and integrity monitoring data transmitted from the CRUM chip 210 in a previous communication, the CRUM chip 210 generates integrity monitoring data a' (operation S330). The CRUM chip 210 compares the generated integrity monitoring data a' and the separated integrity monitoring data a (operation S340). When the generated integrity monitoring data a' is identical with the separated integrity monitoring data a, the CRUM chip 210 determines that the separated integrity monitoring data a as integrity data (operation S350). When the generated integrity monitoring data a' is not identical with the separated integrity monitoring data a, the CRUM chip 210 determines that the separated integrity monitoring data a is in an error state and stops communication operation (S360). For clarity, hereinafter, the integrity monitoring data a' will be referred to as comparative target data.

When it is determined that the separated integrity monitoring data is integrity data in operation S340, the CRUM chip 210 generates integrity monitoring data b using the data b to be transmitted and the integrity monitoring data a (operation S370). Then, the CRUM chip 210 transmits a signal including the data b and the integrity monitoring data b to the main controller 110 (operation S380).

The monitoring process performed in the CRUM chip 210 has been described in FIG. 3. The same monitoring process may be performed in the main controller 110. That is, when the signal including the data b and the integrity monitoring data b is received, the main controller 110 may separate the integrity monitoring data b and performs an integrity monitoring method. The monitoring method may be the same method as a process performed in operations S330 to S370 and therefore a repeated description and illustration will be omitted.

Meanwhile, configurations of the signals transmitted and received between the main controller 110 and the CRUM chip 210 may be variously designed. That is, data included in the signals may include at least one selected from the group consisting of a command, recording target information, result information for a job performed according to the command, information result for integrity monitoring of a previously received signal, and indicator information to inform a position of integrity monitoring data. Here, the result information for integrity monitoring is excluded from a signal which is first transmitted between the main controller 110 and the CRUM chip 210.

Figure 4:
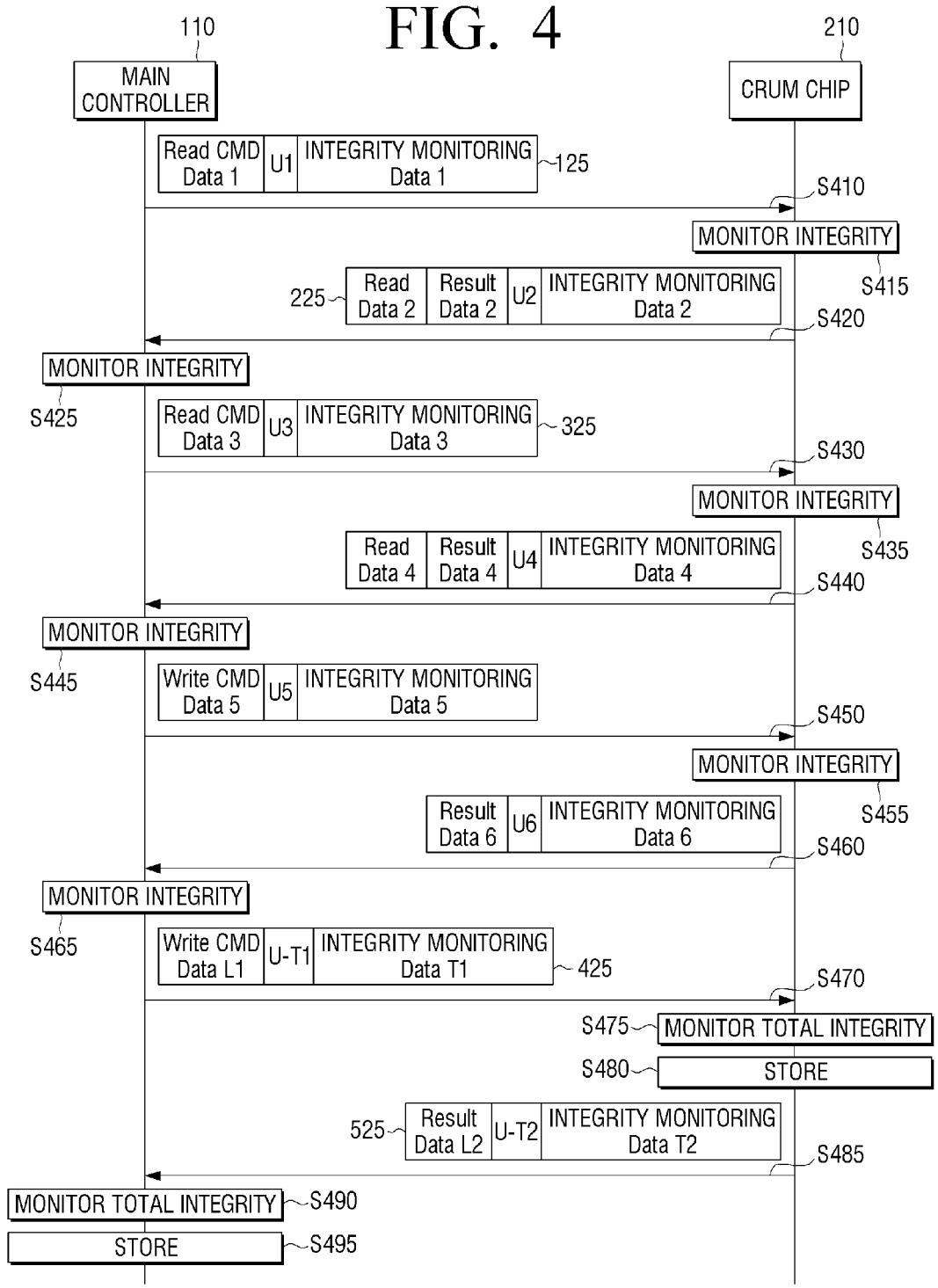
FIG. 4 is a timing diagram illustrating a communication process between a main controller and a CRUM chip in an image forming apparatus according to another exemplary embodiment of the present general inventive concept.

FIG. 4 is a view illustrating a process of monitoring integrity using a signal having a different format from FIG. 2. Referring to FIG. 4, the main controller 110 transmits a signal 125 including data and integrity monitoring data 1 (operation S410). Here, the data includes read command (CMS) data 1 and an indicator U1. The read CMD data 1 includes a command, a read target, a memory address, or the like. The indicator UI denotes indicator information subsequent to the read CMD data 1. The indicator U1 denotes a symbol to inform a parsing position of integrity monitoring data in a signal. The indicator information may be represented as the fixed number of bytes. For example, 5 bytes are used for the indicator information. A size of the read CMD data 1 is variable according to contents of data and thus a size of the integrity monitoring data 1 is also variable.

When the signal 125 is received, the CRUM chip 210 performs integrity monitoring using the integrity monitoring data 1 included in the signal 125 (operation S415). Then, the CRUM chip 210 generates integrity monitoring data 2 using data to be transmitted and the integrity monitoring data 2 and transmits a signal 225 including the data and the integrity monitoring data 2 (operation S420). As illustrated in FIG. 4, the transmitted signal includes result data 2, an indicator U2, and integrity monitoring data 2 representing a performance result of a job performed according to the read data 1 which is data read from a memory provided in the consumables unit 100 according to the read command ("CMD") data 1 and the read CMD data 1.

The main controller 110 separates the integrity monitoring data 2 from the received signal 225 and performs integrity monitoring (operation S425). When next read CMD data 3 is present, the main controller 110 generates integrity monitoring data 3 using the read CMD data 3 and the integrity monitoring data 2 and transmits a signal 325 indicating the read CMD data 3, an indicator U3, and integrity monitoring data 3 to the CRUM chip S210 (operation S430). Then, as illustrated in FIG. 4, communication using integrity monitoring data 4, 5, 6, T1, and T2 are performed (operations S440, S450, S460, S470, S485) and each integrity monitoring is performed to correspond to each communication (operations S345, S445, S455, S465). Meanwhile, a final communication signal 425 is received from the CRUM chip 210 (operation S470), the CRUM chip (210) finally monitors integrity of the data transmitted/received and temporarily stored in total communication processes using the integrity monitoring data T1 included in the final communication signal 425 (operation S475). When it is determined that the data is integrity data as a final monitoring result, the CRUM chip stores the temporarily stored data in a nonvolatile memory (not illustrated) (operation S480). Similarly, when the final communication signal is transmitted from the CRUM chip 210 to the main controller 110 (operation S485), the main controller 110 performs integrity monitoring for total data using the integrity monitoring data T2 included in the final communication signal 525 (operation S490). When it is determined that the total data are integrity data, the main controller 110 stores the temporarily stored data in the nonvolatile memory (operation S495).

Meanwhile, all the integrity monitoring data used in the above-described communication may be generated by cumulatively reflecting the integrity monitoring data used in the previous communication.

For example, the integrity monitoring data may be processed as follow.

Integrity monitoring data $1 = E$(Read $CMD$ Data $1 | U1 |$)

Integrity monitoring data $2 = E$(Read $CMD$ Data $2 |$Result Data $2 | U2 |$Integrity monitoring data 1)

Integrity monitoring data $3 = E$(Read $CMD$ Data $3 | U3 |$Integrity monitoring data 2)

Integrity monitoring data $4 = E$(Read $CMD$ Data $4 |$Result Data $4 | U4 |$Integrity monitoring data 3)

Integrity monitoring data $5 = E$(Read $CMD$ Data $5 |$Integrity monitoring data 4)

Integrity monitoring data $6 = E$(Read $CMD$ Data $6 |$Integrity monitoring data 5)

Integrity monitoring data $T1 = E$(Write $CMD$ Data $L1 | U\text{-}T1 |$Integrity monitoring data T1-1)

Integrity monitoring data $T\text{-}2 = E$(Result Data $L2 | U\text{-}T2 |$Integrity monitoring data $T1$)

In the Equations, $E(\ )$ denotes a function to calculate a result value by applying the preset equation. Thus, the integrity monitoring data may generate a result value by applying various logic operation (for example, addition or exclusive-OR (XOR)) on total data, that is, the previous integrity monitoring data and data to be transmitted, or a result value calculated by substituting other known equations between the main controller 110 and CRUM chip 210 with data, a result value encrypted by applying the above-described various encryption algorithm.

Figure 5:
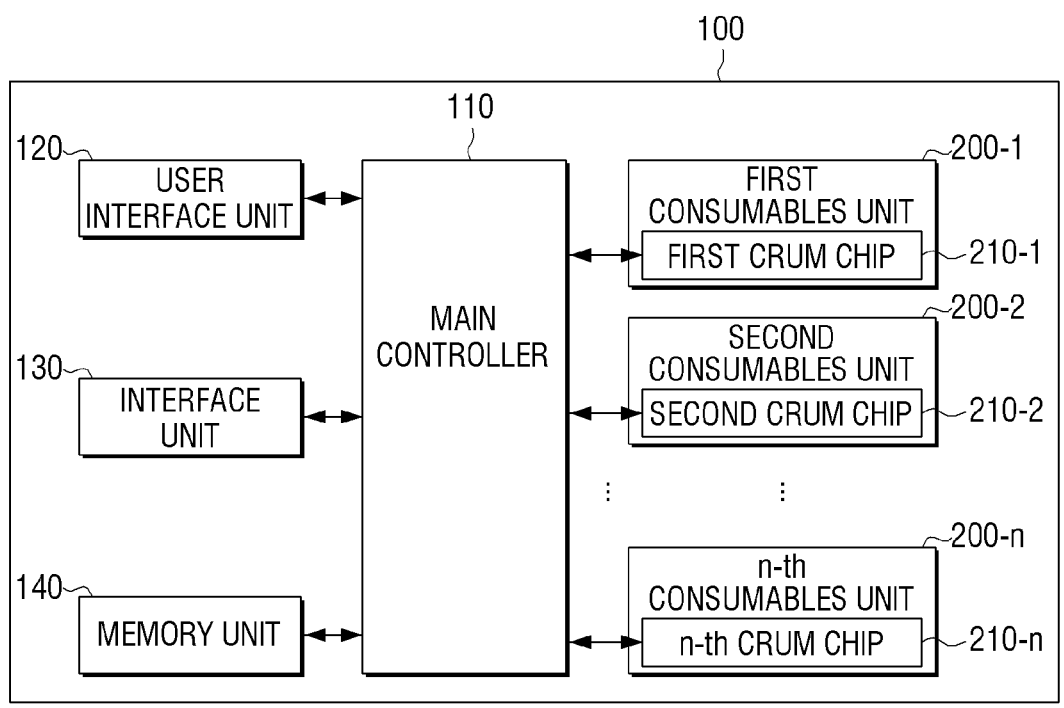
FIG. 5 is a block diagram illustrating a configuration of an image forming apparatus provided with a consumables unit according to an exemplary embodiment of the present general inventive concept.

FIG. 5 is a view illustrating a configuration of an image forming apparatus in which a plurality of consumables units 200-1 to 200-$n$ are mounted in the main body 100 according to an exemplary embodiment.

Referring to FIG. 5, the image forming apparatus includes a main controller 110, a user interface unit 120, an interface unit 130, a memory unit 140, and the plurality of consumables units 200-1 to 200-$n$.

The user interface unit 120 may receive various kinds of commands from a user via displays and may inform the user about various information regarding the status of the consumables units 200-1 to 200-$n$ or regarding the image forming apparatus. The user interface unit 120 may include a liquid crystal display (LED) display, a light emitting diode (LED) display, at least one button, speaker, and the like. In some cases, the user interface unit may include a touch screen.

The interface unit 130 may be configured to be connected to a host personal computer (PC) or various external apparatuses in a wired or wireless manner and perform communication with the host PC or the external apparatuses. The interface unit 130 may include various types of interfaces such as a local interface, a universal serial bus (USB) interface, and a wireless network interface.

The memory unit 140 serves to store various kinds of programs or data necessary to drive the image forming apparatus.

The main controller 110 serves to control an overall operation of the image forming apparatus. Specifically, the main controller 110 may process data received through the interface unit 130 and convert the processed data into a format which enables the image forming apparatus to form an image.

The main controller 110 performs an image forming job for the converted data using the plurality of consumables units 200-1 to 200-$n$. Here, the consumables units may be variously provided according to a kind of the image forming apparatus. When the image forming apparatus is a printer as described above, the consumables units may include a charging unit, an exposure unit, a developing unit, a transfer unit, a fusing unit, various kinds of rollers, a belt, an OPC drum, and the like.

Each of a first CRUM chip 210-1 to an n-th CRUM chip 210-$n$ is included in each of the consumables units 200-1 to 200-$n$.

Each of the first CRUM chip 210-1 to the n-th CRUM chip 210-$n$ may include a memory (as illustrated in FIG. 1), a CPU, and the like. Alternatively, according to an exemplary embodiment, each of the first CRUM chip 210-1 to the n-th CRUM chip 210-$n$ may further include separately or as part of the CPU at least one selected from the group consisting of a crypto module (not illustrated), a tamper detector (not illustrated), an interface unit (not illustrated), a clock unit (not illustrated) configured to output a clock signal, a random value generating unit (not illustrated) configured to generate a random value for certification.

The crypto module may support an encryption algorithm and enable the CPU to perform certification or communication with the main controller 110. Specifically, the crypto module may support a preset algorithm among four encryption algorithms, that is, an ARIA algorithm, a TDES algorithm, a seed algorithm, and an AES symmetric key algorithm. In this case, a side of the main controller 110 may support a corresponding algorithm among the four encryption algorithms. Thus, the main controller 110 may recognize an encryption algorithm used in the consumables units 200-1 to 200-n, perform certification using the recognized algorithm, and perform encryption communication. As a result, even when a key applying any encryption algorithm is issued to the consumables unit 200-1 to 200-n, the main controller 110 may be easily mounted in the main body 100 and perform the encryption communication.

The tamper detector is a unit configured to protect various physical hacking attempts, that is, tampering. Specifically, the tamper detector monitors an operation environment such as a voltage, a temperature, a pressure, light, and a frequency and detects an attempt such as "Decap", the tamper detector erases data or physically blocks the attempt. In this case, the tamper detector may include separate power.

Meanwhile, the memory provided in the CRUM chip 210 may include an OS memory (not illustrated), a nonvolatile memory (not illustrated), a volatile memory (not illustrated), and the like. The OS memory stores an OS for driving each of the consumables units 200-1 to 200-n. The nonvolatile memory stores various kinds of data in a nonvolatile type. The nonvolatile memory may store various information such as status information each of the consumables units 200-1 to 200-n (for example, information for a remaining amount of toner, information for replacement time, information for the number of remaining printing sheets, and the like), a unique information (for example, information for a manufacturer, information for a manufacture date, a serial number, a model name of a product, and the like), and after service (A/S) information. In particular, data received in a communication process with the main controller 110 may be stored in the nonvolatile memory.

The volatile memory may be used as a temporarily storage space necessary to an operation. The volatile memory may temporarily store data which is determined as integrity data in each communication and integrity monitoring data used in the integrity determination.

The interface unit serves to connect the CPU and the main controller 110. Specifically, the interface unit may be implemented with a serial interface and a wireless interface. In particular, since the serial interface uses a small number of signals as compared with a parallel interface to obtain an effect of reduction in a cost, a serial interface may be suitable for a noisy operation environment such as a printer.

As described above, each of the consumables units is provided with each of the CRUM chips. Each of the CRUM chips may perform communication with the main controller and other CRUM chips. New integrity monitoring data is generated by cumulatively reflecting integrity monitoring data used in previous communication and transmitted in each communication.

Figure 6:
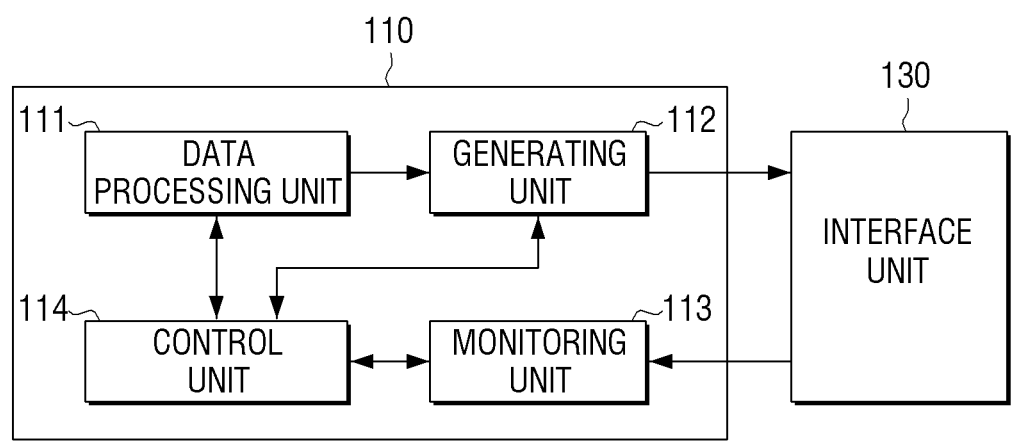
FIGS. 6 and 7 are block diagrams illustrating configurations of image forming apparatuses according to various exemplary embodiments of the present general inventive concept.

FIG. 6 is a block diagram illustrating a configuration example of an image forming apparatus according to an exemplary embodiment. Referring to FIG. 6, the image forming apparatus includes a main controller 110 and an interface unit 130. The main controller includes a data processing unit 111, a generating unit 112, a monitoring unit 113, and a control unit 114.

The data processing unit 111 generates data to be transmitted to a CRUM chip installed in the consumables unit which is mountable on the image forming apparatus. Here, the data includes at least one among a command and information to be processed according to the command. That is, in the case of a read command, information for a memory address to be read or a read target may be transmitted together with the read command. Alternatively, in the case of a write command, information to be written may be transmitted together with the write command. The data processing unit 111 may output data intact or encrypt data and output the encrypted data. In addition, the command and information may be generated before and after performing an image forming job or during the performing of an image forming job. For example, when the image forming apparatus turns on or the consumables unit 200 is detached and mounted again on the image forming apparatus, or when a start command for the image forming job is input, the main controller 110 may transmit a certification command for certification or read command to certify the consumables unit 200. Thus, the main controller 110 may confirm various information which is autonomously managed in the consumables unit 200 to certify the consumables unit 200 or store the information in the memory unit 140 of the main body of the image forming apparatus.

In addition, while performing the image forming job or after image forming job is performed, the data processing unit 111 may generate a write command and information to correspond to the write command to record information for consumables consumed in the image forming job. That is, information for ink or toner or history information such as the number of printing sheets, the number of printing dots, and user information may be generated and stored in the consumables unit 200.

The generating unit may generate integrity monitoring data using data output from the data processing unit 111. Specifically, the generating unit may output a result value generated by simply adding the data output from the data processing unit 111 or by performing a logical operation such as XOR on the data output from the data processing unit 111. A result value may be generated by substituting a preset equation using the data output from the data processing unit 111, or a result value may be generated by encrypting the data output from the data processing unit 111 as the integrity monitoring data. In this case, when the integrity monitoring data used in the previous communication is present, the generating unit 112 generates the integrity monitoring data by cumulatively reflecting the integrity monitoring data together with existing integrity monitoring data.

The integrity monitoring data generated in the generating unit 112 is added to the data generated in the data processing unit 111 and transmits the added result to the interface unit 130. FIG. 6 illustrates that the output of the data processing unit 111 is provided to only the generating unit 112, but the output of the data processing unit 111 may be directly provided to the interface unit 130 or be provided to a multiplexer (not illustrated). When the multiplexer is provided, the output of the generating unit 112 is also provided to the multiplexer and transmitted to the interface unit 130 in a signal in which the data and the integrity monitoring data are included together.

The interface unit 130 transmits a signal including data and first integrity monitoring data to the CRUM chip 210.

In addition, the interface unit 130 may receive a response signal from the CRUM chip 210. For clarity, the signal transmitted from the interface unit 130 is referred to as a first signal and the signal received from the CRUM chip is referred to as a second signal. Second integrity monitoring data included in the second signal is data generated by cumulatively reflecting the first integrity monitoring data.

The monitoring unit 113 separates the second integrity monitoring data included in the second signal received through the interface unit 130 and monitors integrity of data included in the second signal. Specifically, the monitoring unit 113 generates integrity monitoring data by applying a method known between the main controller 110 and the CRUM chip 210 on the integrity monitoring data previously transmitted.

The monitoring unit 113 compares the integrity monitoring data generated as described above and the second integrity monitoring data separated from the second signal and confirms whether or not the integrity monitoring data is identical with the second integrity monitoring data. When the integrity monitoring data is identical with the second integrity monitoring data, the monitoring unit 113 determines a corresponding data as having integrity, or as integrity data. When the integrity monitoring data is not identical with the second integrity monitoring data, the monitoring unit 113 determines the corresponding data as an error state.

The control unit 114 performs a next communication according to a monitoring result of the monitoring unit 113. That is, when it is determined that the second signal includes data of an error state, the control unit stops the next communication or attempts the next communication again. Meanwhile, when it is determined that the second signal is in a normal state, that is, an integrity state, the control unit 114 performs the next communication.

According to an exemplary embodiment, if it is determined that the second signal is in an integrity state, the control unit 114 may directly store a corresponding data in the memory unit 140.

According to another exemplary embodiment, the control unit 114 may enable the data and integrity monitoring data obtained in each communication to be temporarily stored and enable the temporarily stored data to be recorded in the memory unit 140 when a final communication is completed.

Figure 7:
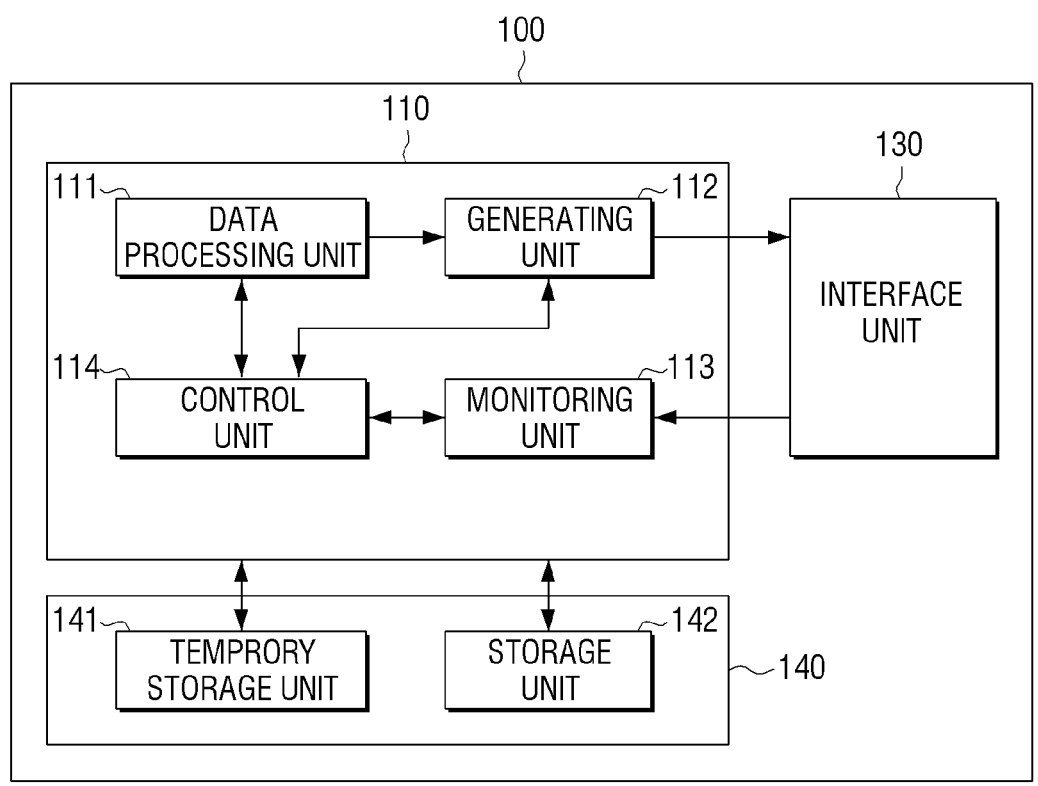

FIG. 7 illustrates a configuration of an image forming apparatus according to the above-described exemplary embodiment. Referring to FIG. 7, in addition to main controller 110 including a data processing unit 111, a generating unit 112, a monitoring unit 113, and a control unit 114 and the interface unit 130, the image forming apparatus may further include a memory unit 140. The memory unit 140 may include a temporary storage unit 141 and a storage unit 142.

Therefore, the temporary storage unit 141 may temporarily store data determined as integrity data and integrity monitoring data. The temporarily stored integrity monitoring data may be used in monitoring integrity of data in a next communication process.

That is, when a second signal for a first signal is transmitted after the first signal including first integrity monitoring data is transmitted to the CRUM chip 210, the monitoring unit 113 separates second integrity monitoring data from the second signal and generates new integrity monitoring data, that is, comparative target data using remaining data and the integrity monitoring data stored in the temporary storage unit 141. The monitoring unit 113 may compare the generated new integrity monitoring data and the second integrity monitoring data stored in the temporary storage unit 141 and determine integrity of the second signal or integrity of data included in the second signal.

Meanwhile, when the second signal is an integrity state and next data to be transmitted to the CRUM chip 210 is present, the generating unit 112 generates third integrity monitoring data based on the next data and the second integrity monitoring data. Thus, the interface unit 130 transmits a third signal including the third integrity monitoring data and the next data to the CRUM chip 210. That is, as illustrated in FIGS. 2 to 4, the main controller 110 and the CRUM chip 210 may perform communication with each other several times.

When one image forming job is completed, the monitoring unit 113 may finally monitor total signals received in the image forming job using final integrity monitoring data included in a signal which is finally received in the image forming job. That is, as described above, the integrity monitoring data transmitted/received in each communication is generated by cumulatively reflecting previous integrity monitoring data so that the final integrity monitoring data includes all integrity monitoring data, that is, initial integrity monitoring data to integrity monitoring data just before the final integrity monitoring data. Therefore, when it is determined that the data is integrity data using the final integrity monitoring data, the monitoring unit 113 determines that total communication content is reliable and stores total data in the storage unit 142 of the memory unit 140.

Meanwhile, the main controller 110 and the CRUM chip 210 transmit a signal including an indication representing initial communication in the initial communication and transmit a signal including an indication representing final communication in the final communication. Thus, the main controller 110 and the CRUM chip 210 perform the final monitoring and store the data in the storage unit 142 when the final communication indication is confirmed in the signal received from each other.

The final monitoring may be performed when one image forming job is processed. According to an exemplary embodiment, the final monitoring may be performed in units of a preset time period. In addition, the final monitoring may be performed when a user command for data storage is input or a turn-off command for the image forming apparatus is input.

In addition, FIGS. 6 and 7 illustrate the configuration in which the data processing unit 111, the generating unit 112, the monitoring unit 113, and the control unit 114 are included in the main controller 110, but the main controller is not limited to the above-described configuration. That is, at least one of the data processing unit 111, the generating unit 112, the monitoring unit 113, and the control unit 114 may be provided separately from the main controller 110. In this case, differently from the descriptions of FIGS. 1 to 4, the main controller 110 may perform an original function and communication with the CRUM chip 210 may be performed by the data processing unit 111, the generating unit 112, the monitoring unit 113, and the control unit 114.

Figure 8:
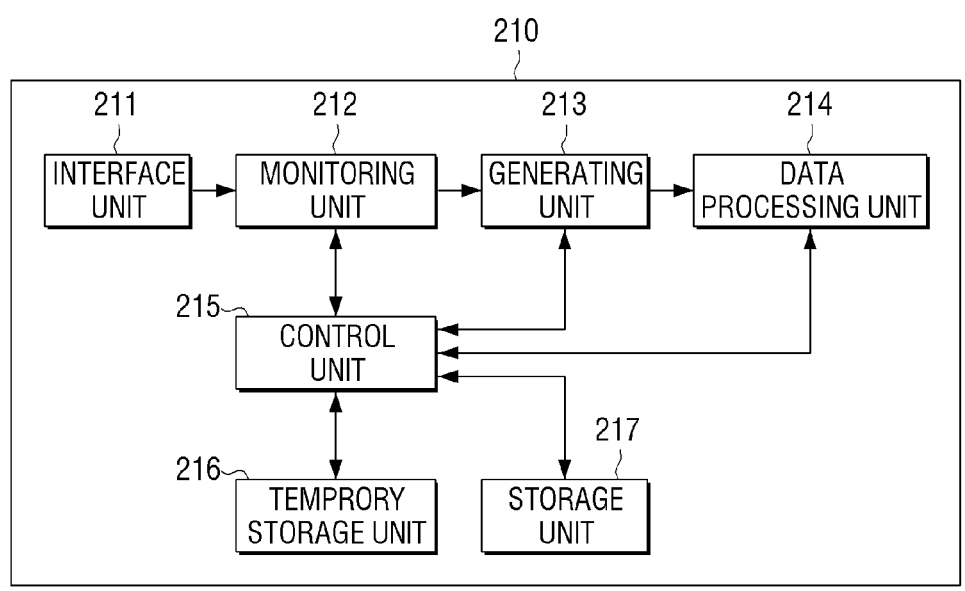
FIG. 8 is a block diagram illustrating a configuration of a CRUM chip according to an exemplary embodiment of the present general inventive concept.

FIG. 8 is a block diagram illustrating a configuration of the CRUM chip 210 according to an exemplary embodiment. Referring to FIG. 8, the CRUM chip 210 includes an interface unit 211, a monitoring unit 212, a generating unit 213, a data processing unit 214, a control unit 215, a temporary storage unit 216, and the storage unit 217.

The interface unit 211 receives a first signal including first data and integrity monitoring data for the first data from a main body of an image forming apparatus, that is, a main controller 110 mounted on the main body.

The monitoring unit 212 separates the first integrity monitoring data from the first signal and monitors integrity of the first signal. A monitoring method of the monitoring unit 212 has been described as described above and thus a repeated description will be omitted.

The temporary storage unit 216 temporarily stores the first data and the first integrity monitoring data when the first signal is determined as having integrity.

The data processing unit 214 generates second data when the second data to be transmitted to the main body of the image forming apparatus is present.

The generating unit 213 generates second integrity monitoring data using the generated second data and the first integrity monitoring data.

The control unit 215 controls the interface unit 211 to transmit the second signal including the second data and the first integrity monitoring data. In addition, the control unit 215 controls an overall operation of the CRUM chip 210. That is, the CRUM chip is provided with an OS as described above, and the control unit 215 may drive the CRUM chip using the OS. In particular, when an initialization program is stored in the memory of the CRUM chip 210, initialization of the CRUM chip 210 may be performed separately from the main body of the image forming apparatus.

The control unit 215 may perform jobs to correspond to the various kinds of commands received from the main body of the image forming apparatus. That is, when a read command is received, the control unit 215 reads data stored in the storage unit 217 according to the read command and transmits the read data to the image forming apparatus through the interface unit 211. In the process, integrity monitoring data is added.

The monitoring unit 212 performs integrity monitoring for a third signal when the third signal including the third integrity monitoring data generated by cumulatively reflecting the second integrity monitoring data.

When the image forming job is completed, the control unit 215 finally monitors integrity of total signals received from a process of performing the image forming job using final integrity monitoring data included in a signal finally received in the process of performing the image forming job.

When communication is completed having an integrity state as a result, all data temporarily stored in the temporary storage unit 216 is stored in the storage unit 217.

That is, when the communication is finally terminated, the control unit 215 controls the monitoring unit 212 to perform the final monitoring using the final integrity monitoring data. Thus, when the final integrity monitoring data is determined as a final monitoring operation of the monitoring unit 212, the control unit 215 stores the data temporarily stored in the temporary storage unit 216 in the data storage unit 217.

An operation of the CRUM chip 210 is similar to that of the image forming apparatus. That is, the main controller 110 of the image forming apparatus and the CRUM chip 210 of the consumables unit 200 operate to correspond to each other as illustrated in FIGS. 1 to 4. Therefore, an algorithm which generates integrity monitoring data and monitors integrity using the generated integrity monitoring data should be commonly provided in the main controller 110 and the CRUM chip 210.

Figure 9:
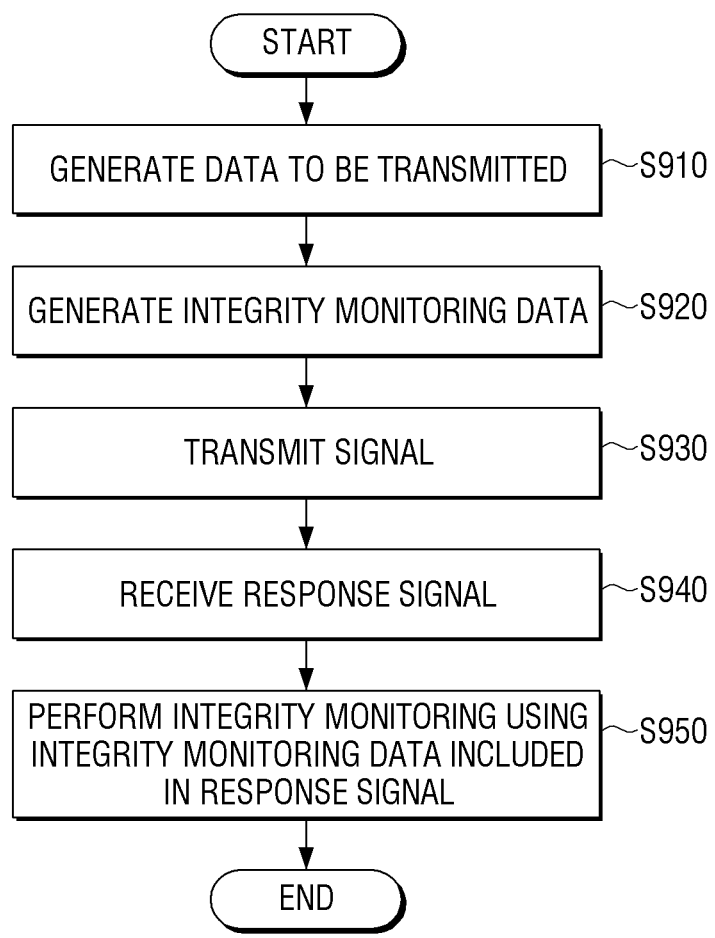
FIGS. 9 and 10 are flowcharts illustrating communication methods according to various exemplary embodiments of the present general inventive concept.

FIG. 9 is a flowchart illustrating a communication method according to an exemplary embodiment. The communication method in FIG. 9 may be performed in the main controller 110 provided in the main body of the image forming apparatus or performed in the CRUM chip 210 provided in the consumables unit 200.

Referring to FIG. 9, when data to be transmitted is generated (operation S910), integrity monitoring data is generated using the data (operation S920). The generation of the integrity monitoring data is the same as in the above-described description and thus the detailed description will be omitted.

A signal including the generated integrity monitoring data and data is transmitted (operation S930).

Thereby, a response signal to correspond to the transmitted signal is transmitted from the opposite side and received (operation S940). New integrity monitoring data which is generated by cumulatively reflecting the integrity monitoring data transmitted in operation S930 is included in the response signal.

Integrity monitoring is performed using the integrity monitoring data included in the response signal (operation S950).

According to the application of the present general inventive concept as described above, integrity for each communication may be determined cumulatively using previous integrity monitoring data.

Figure 10:
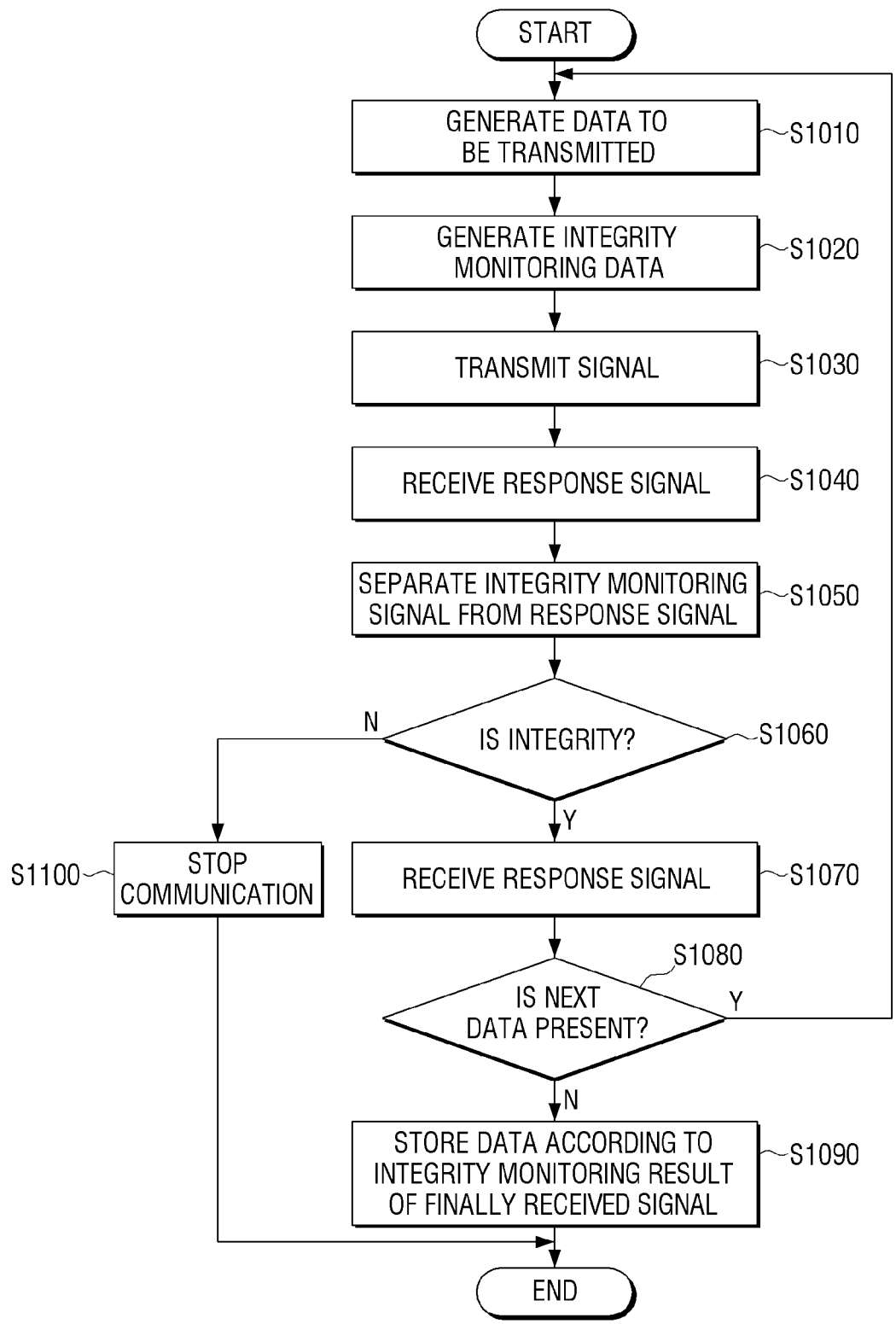

FIG. 10 is a flowchart illustrating a communication method according to a detailed exemplary embodiment. Referring to FIG. 10, when data to be transmitted is generated (operation S1010), integrity monitoring data is generated based on the data (operation S1020). A signal including the data and the integrity monitoring data is transmitted (operation S1030) and a response signal responding to the signal is received (operation S1040). The integrity monitoring data is separated from the response signal (operation S1050).

It is determined where or not the separated integrity monitoring data is integrity data using remaining data in which the integrity monitoring data is separated and existing integrity monitoring data (operation S1060).

When it is determined that the integrity monitoring data is integrity data, the integrity monitoring data is temporarily stored (operation S1070). When it is determined that the integrity monitoring data is an error state, communication stops (operation S1100) and is performed again.

When next data is present in the temporarily stored state (operation S1080), the process proceeds to operation S1010 and the above-processes are iteratively performed. When the next data is not present, the temporarily stored data is stored according to an integrity monitoring result of a finally received signal (operation S1090).

According to the above-described exemplary embodiments, integrity monitoring data transmitted from the main controller of the image forming apparatus when data communication initially starts and the integrity monitoring data is generated by cumulatively reflecting integrity monitoring data in previous communications. As a result, all the integrity monitoring data used in total communication processes are included in the integrity monitoring data in the final communication. Therefore, it is possible to record accurate data.

Therefore, it is possible to safely protect the information of the main controller and CRUM chip from external factors such as noise generated in communication, a contact failure, or hacking.

The above-described exemplary embodiments have described based on the image forming apparatus and the CRUM chip mounted on the consumables unit used in the image forming apparatus, but the communication methods may be applied to other types of apparatuses. For example, the contents described herein may be used when communication between the CRUM chip and an apparatus manufactured to communicate with the CRUM chip other than the image forming apparatus is performed, or when communication between a general electronic apparatus and a memory installed in a part used therein is performed, or when communication between parts is performed.

A program to execute the communication methods according to the above-described various exemplary embodiments can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Specifically, a program code to execute the navigation method and the image processing method may be stored in various types of recording media readable by a terminal such as a random access memory (RAM), a flash memory, a read only memory (ROM), an erasable programmable ROM (EPROM), an electronically erasable and programmable ROM (EEPROM), a register, a hard disc, a removable disc, a memory card, a USB memory, a compact disc ROM (CD-ROM).

According to the above-described various exemplary embodiments, it is possible to promote stability of entire communication cumulatively using integrity monitoring data which has been previously used. Therefore, information of a consumables unit and an image forming apparatus is stably managed.

The foregoing exemplary features and utilities are merely exemplary and are not to be construed as limiting the present general inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A customer replaceable unit monitoring (CRUM) chip mountable on an image processing unit, the CRUM chip comprising:
   an interface unit configured to receive a first signal including first data and first integrity monitoring data for the first data from a main body of the image forming apparatus;
   a monitoring unit configured to separate the first integrity monitoring data from the first signal and monitor integrity of the first signal;
   a data processing unit configured to generate second data to be transmitted to the main body of the image processing unit;
   a generating unit configured to generate second integrity monitoring data using the second data and the first integrity monitoring data; and
   a control unit configured to control the interface unit to transmit a second signal including the second data and the second integrity monitoring data to the main body of the image forming apparatus.

2. The CRUM chip as claimed in claim 1, further comprising:
   a temporary storage unit configured to store the first data and the first integrity monitoring data included in the first signal when it is determined that the first signal has integrity; and
   a storage unit configured to store the data temporarily stored in the temporary storage unit.

3. The CRUM chip as claimed in claim 2, wherein the monitoring unit generates comparative target data using remaining data included in the first signal, compares the second integrity monitoring data separated from the second signal with the comparative target data, determines the second signal as having integrity when the second integrity monitoring data is identical with the comparative target data, and determines the second signal as an error state when the second integrity monitoring data is not identical with the comparative target data.

4. The CRUM chip as claimed in claim 3, wherein the monitoring unit performs integrity monitoring for a third signal including third integrity monitoring data, which is generated by cumulatively reflecting the second integrity monitoring data, when the third signal is received through the interface unit, and finally monitors integrity of total signals, which are received in a process of performing an image forming job, using final integrity monitoring data included in a signal finally received in the process of performing an image forming job when the image forming job is completed, and
   the control unit stores the data temporarily stored in the temporary storage unit in the storage unit when it is determined that the total signals have integrity as a final monitoring result.

5. The CRUM chip as claimed in claim 1, wherein the first data or the second data includes at least one selected from the group consisting of a command, a recording target information, information for job performance result according to the command, information for integrity monitoring result about a previously received signal, and indicator information to inform a position of the first and second integrity monitoring data, and
   the information for integrity monitoring result is excluded in a signal first transmitted from the CRUM chip.

6. The CRUM chip as claimed in claim 5, wherein the integrity monitoring data is a result value for logic operation of the data, a result value generated by applying a preset equation for the data, or an encryption result value in which the data is encrypted.

7. A communication method of a CRUM chip mountable on an image forming apparatus, the method comprising:
   receiving a first signal including first data and first integrity monitoring data for the first data from a main body of the image forming apparatus;
   separating the first integrity monitoring data from the first signal and monitoring integrity of the first signal;
   temporarily storing the first data and the first integrity monitoring data included in the first signal when it is determined that the first signal is integrity data;
   generating second data to be transmitted to a main body of the image forming apparatus when the second data is present;
   generating second integrity monitoring data using the second data and the first integrity monitoring data; and
   transmitting a second signal including the second data and the second integrity monitoring data to the main body of the image forming apparatus.

8. The method as claimed in claim 7, wherein the monitoring includes:
   separating the first integrity monitoring data from the first signal;
   generating comparative target data using remaining data included in the first signal; and
   comparing the second integrity monitoring data separated from the second signal with the comparative target data, determining the second signal as having integrity when the second integrity monitoring data is identical with the comparative target data, and determining the second signal as an error signal when it is determined that the second integrity monitoring data is not identical with the comparative target data.

9. The method as claimed in claim 8, further comprising performing integrity monitoring for a third signal including third integrity monitoring data, which is generated by cumulatively reflecting the second integrity monitoring data, when the third signal is received from the body of the image forming apparatus.

10. The method as claimed in claim 9, further comprising:
   finally monitoring integrity of the total signals received in a process of performing an image forming job using final integrity monitoring data included in a signal finally received in the process of performing an image forming job, when the image forming job is completed; and
   storing signals temporarily stored when it is determined that the total signals have integrity.

11. The method as claimed in claim 7, wherein the first data or the second data includes at least one selected from the group consisting of a command, a recording target information, information for job performance result according to the command, information for integrity monitoring result about a previously received signal, and indicator information for informing a position of the first and second integrity monitoring data, and the information for integrity monitoring result is excluded in a signal first transmitted from the CRUM chip.

12. The method as claimed in claim 11, wherein the wherein the first and second integrity monitoring data is a result value for logic operation of the data, a result value generated by applying a preset equation for the data, or an encryption result value in which the data is encrypted.

13. A method of establishing communication between a CRUM chip mountable on an image forming apparatus, the method comprising:
   initializing the CRUM chip separate from an initialization of the image forming apparatus;
   receiving a first signal including first data and first integrity monitoring data;
   generating second integrity monitoring data and verifying the integrity of the first signal;
   generating and transmitting a second signal including second data and the second integrity monitoring signal that includes the first integrity monitoring data; and
   verifying the integrity of the second signal to establish communication between the consumables unit and the image forming apparatus.

14. The method of claim 13, wherein verifying the integrity of a signal includes comparing received integrity monitoring data to generated integrity monitoring data.

15. The method of claim 13, wherein the initializing of the CRUM chip is performed by a CPU of the CRUM chip.

16. The method of claim 13, wherein the CRUM chip does not respond to a command of the image forming apparatus until after initialization is complete.

17. The method of claim 13, wherein the integrity monitory data is error detection data.

* * * * *